United States Patent [19]
Crowe

[11] 4,229,014
[45] Oct. 21, 1980

[54] AIR-EXPANDED MANDREL HAVING MEANS TO EQUALIZE EXPANSION TO OBTAIN CONCENTRIC CHUCKING

[75] Inventor: Thomas J. Crowe, 177 Rockaway Ave., Rockaway, N.J. 07866

[73] Assignee: Thomas J. Crowe, Rockaway, N.J.

[21] Appl. No.: 971,521

[22] Filed: Dec. 20, 1978

Related U.S. Application Data

[63] Continuation of Ser. No. 850,497, Nov. 11, 1977, abandoned.

[51] Int. Cl.³ .............................................. B23B 31/40
[52] U.S. Cl. ..................................... 279/2 A; 279/4; 279/66; 242/72 B
[58] Field of Search ..................... 279/2 A, 4, 66, 110; 242/72 B; 269/48.1; 82/44; 29/113 R

[56] References Cited
U.S. PATENT DOCUMENTS

| 3,048,345 | 8/1962 | Willard | 242/72 B |
| 3,391,878 | 7/1968 | Naccara | 242/72 B |
| 3,414,210 | 12/1968 | Gaudin | 242/72 B |
| 3,863,857 | 2/1975 | Smith | 242/72 B |

Primary Examiner—Gil Weidenfeld

[57] ABSTRACT

A fluid actuated expanding mandrel or internal chuck is provided with means including very stiff springs to cause the expanding members to move outwardly a substantially equal amount, whereby a roll or workpiece is concentrically mounted, despite looseness between the bore of the roll or workpiece and the mandrel or internal chuck. A correspondingly inverted arrangement affords concentric chucking on the outer diameter of solid workpieces.

7 Claims, 8 Drawing Figures

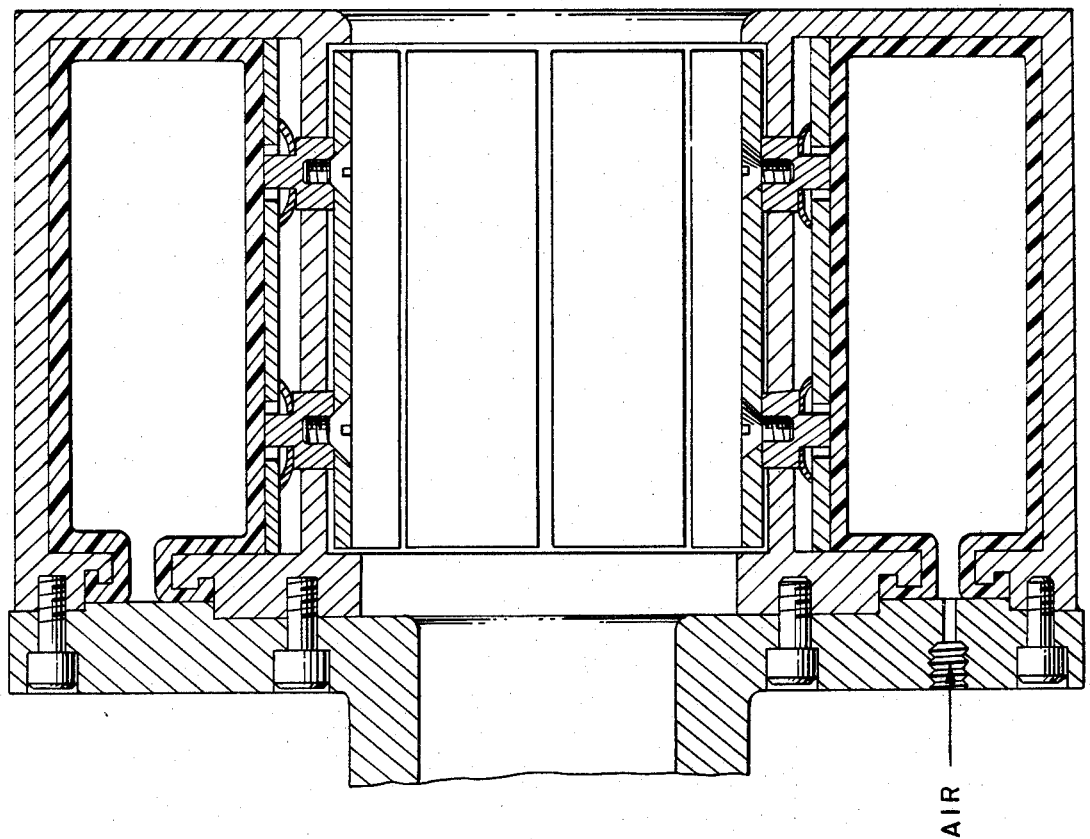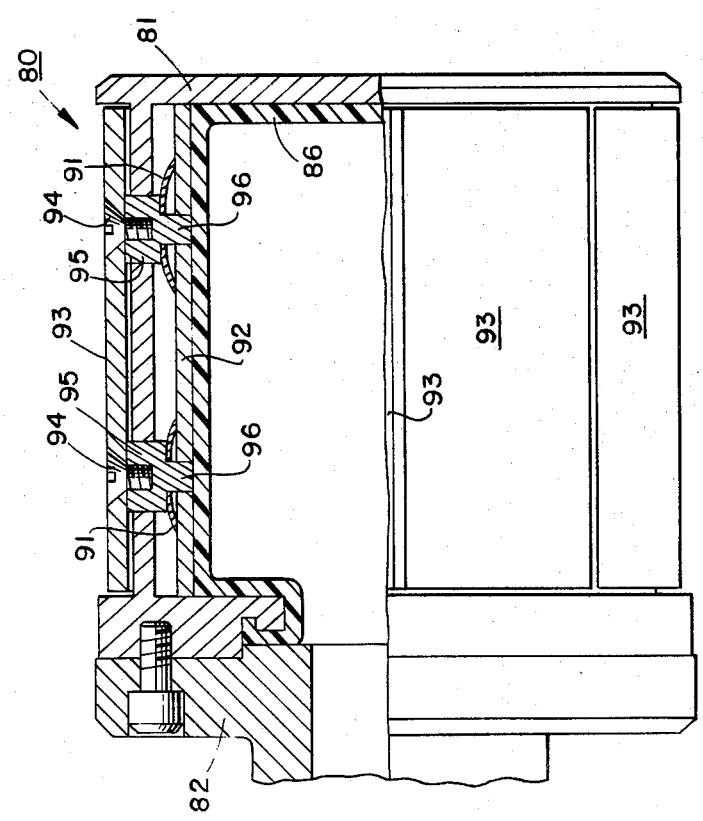

AIR-EXPANDED MANDREL HAVING MEANS TO EQUALIZE EXPANSION TO OBTAIN CONCENTRIC CHUCKING

This is a continuation of application Ser. No. 850,497, filed Nov. 11, 1977 now abandoned.

BRIEF SUMMARY OF INVENTION

In order to concentrically support a roll or workpiece having an internal bore on a fluid-expanded mandrel or internal chuck, despite looseness between said bore and the external supporting surfaces areas of the mandrel or internal chuck, it is necessary to spread the looseness uniformly about the bore, despite the tendency for the roll or workpiece and the mandrel or internal chuck to hang eccentrically, with respect to each other, when first assembled.

Concentricity is achieved by driving the expanding members outwardly by means of very stiff springs, which are, in turn, driven outwardly a fixed and equal amount, by fluid actuated means. The stiffness of the springs is so great that their relative deflection by the weight of any part involved is negligible. The eccentricity which results upon first assembly is removed, by the lifting up, against the force of gravity, of the downwardly hanging part, when the fluid actuated means drives the springs outwardly.

The use, in a correspondingly inverted manner, of very stiff springs to drive inwardly the jaws of an external chuck, permits concentric chucking of workpieces which do not have an internal bore.

VIEWS OF THE DRAWINGS

FIG. 7 is a partly exploded cross-sectional view of an air-expanding internal chuck; and FIG. 8 is a cross-sectional view of an air-contracting external chuck.

DETAILED DESCRIPTION

A specific environment in which the invention is useful is one in which sheet material is unrolled at an input end of a sheet material processing machine and rolled up at the output end. If the machine is run so that the sheet material is fed through at a constant linear speed, the rotational speed of the input and output rolls will be very high at the end and start, respectively, of the run.

Unbalance of said rolls, caused by eccentric mounting, causes vibration which can damage the equipment and must be controlled by reducing the speed of the machine.

Figure 1:
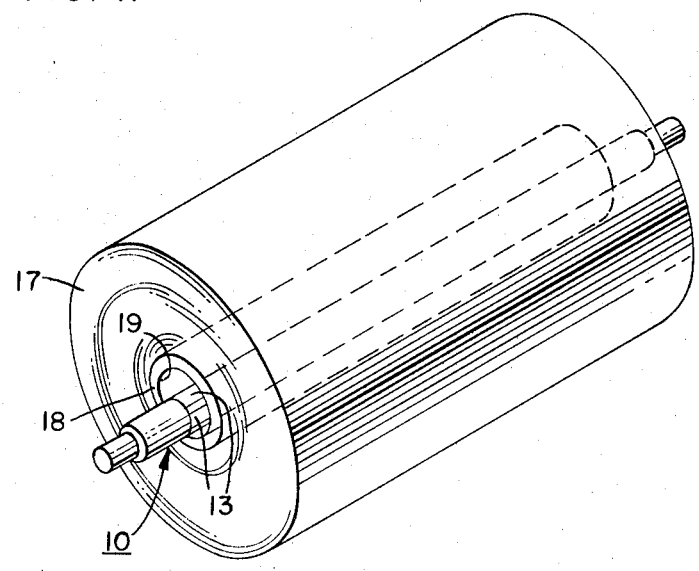
FIG. 1 is a perspective view of a roll of sheet material with an expanding mandrel threaded through the core.

To explain how eccentric mounting can occur, reference is made to FIG. 1 which shows a roll of sheet material 17 resting on the floor, with an mandrel 10 (called a shaft in the industry) loosely placed inside the fiber core 18 on which the sheet material is wound. It will be noted that the shaft 10 is provided with outer leaves 13 which can be expanded against the internal bore 19 of core 18 so that the roll 17 can be supported by shaft 10. The looseness or clearance between shaft 10 and the bore 19 is grossly exaggerated in the drawing, for purpose of exposition. In actual practice, the shaft 10 will have a clearance of only about 1/16 inch for a 3 inch internal diameter core. This amount of clearance permits easy insertion of the shaft 10 in roll 17, and reduces the required range of expansion of the outer leaves 13.

Figure 2:
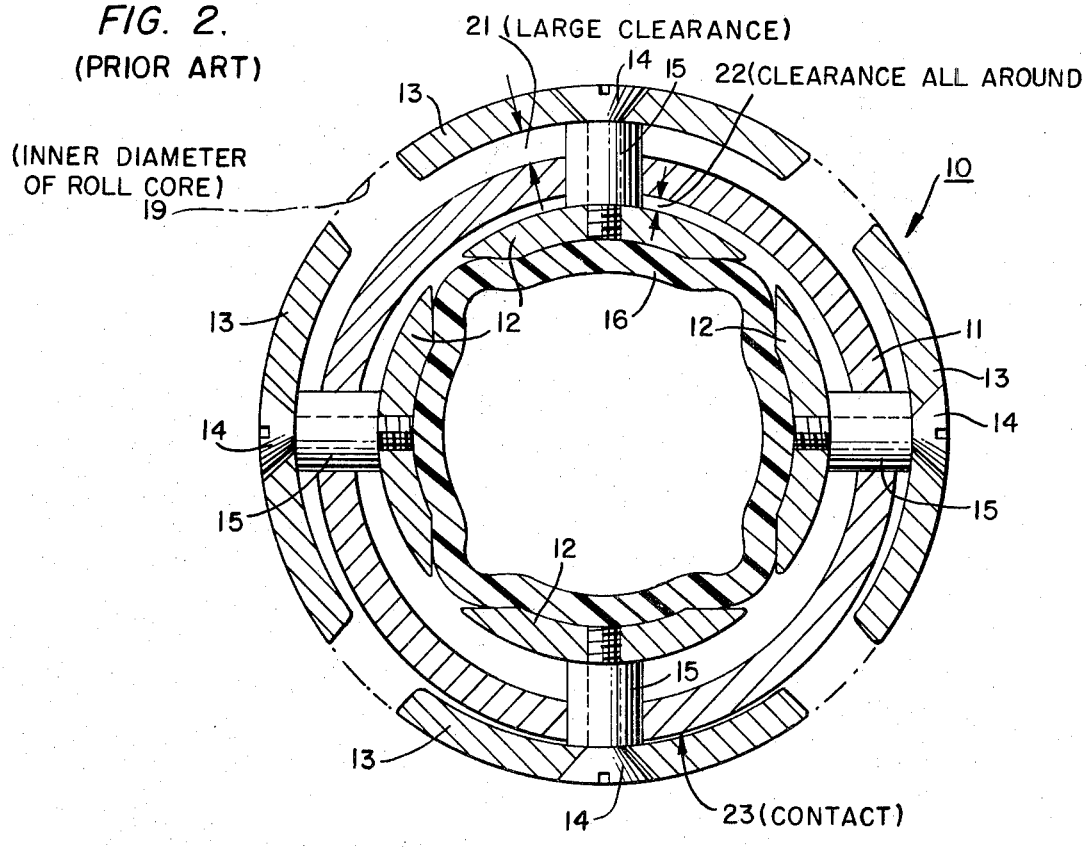
FIG. 2 is a cross-sectional view of a prior art air-expanding mandrel.

FIG. 2 shows what happens when the bladder 16 of shaft 10 is pressurized to clamp shaft 10 inside the bore 19.

The bladder 16 bears against the inner leaves 12, driving them outwardly, thereby pushing out the spacing collars 15, which project through holes in the main body 11 of shaft 10 and the spacing collars 15 drive outwardly three of the four outer leaves 13. The fourth bottommost leaf 13 is not driven outwardly, but stays in contact with the main body, as shown at 23, because the outward force from bladder 16 is equal on all leaves 13, and only the bottommost leaf is restrained by the weight of shaft 10, from separating from the main body 11.

FIG. 2 shows the leaves 13 fully expanded within the bore 19, with the shaft 10 eccentric with respect to bore 19, as shown by the zero clearance at 23 and the large clearance on the diametrically opposite side at 21.

It will be noted from FIG. 2 that, when the bladder is fully expanded, there is everywhere a clearance 22 between the outside of the inner leaves 12 and the inside of the main body 11. That is, the inner leaves 12 do not bottom on the inside of main body 11 when the bladder 16 is fully expanded. Thus, the force of the bladder 16 is completely transmitted to the outer leaves and the extent of outward motion is determined only by the size of internal bore 19. If bottoming did take place, the further outward motion of the outer leaves 13 would be halted and they could no longer grip the internal bore 19 with proper force.

The instant invention is a departure from the prior art just discussed in that bottoming of the inner leaves is desired and very stiff springs connect the inner and outer leaves, to transmit the outward force from inner leaf to outer leaf, while yet accommodating slight differences in the internal diameters of the cores of different rolls. The springs are sufficiently stiff so that relative deflections of different ones of the several springs, because of the weights of the parts involved, is negligible. Thus, substantial concentricity is achieved.

Figure 3:
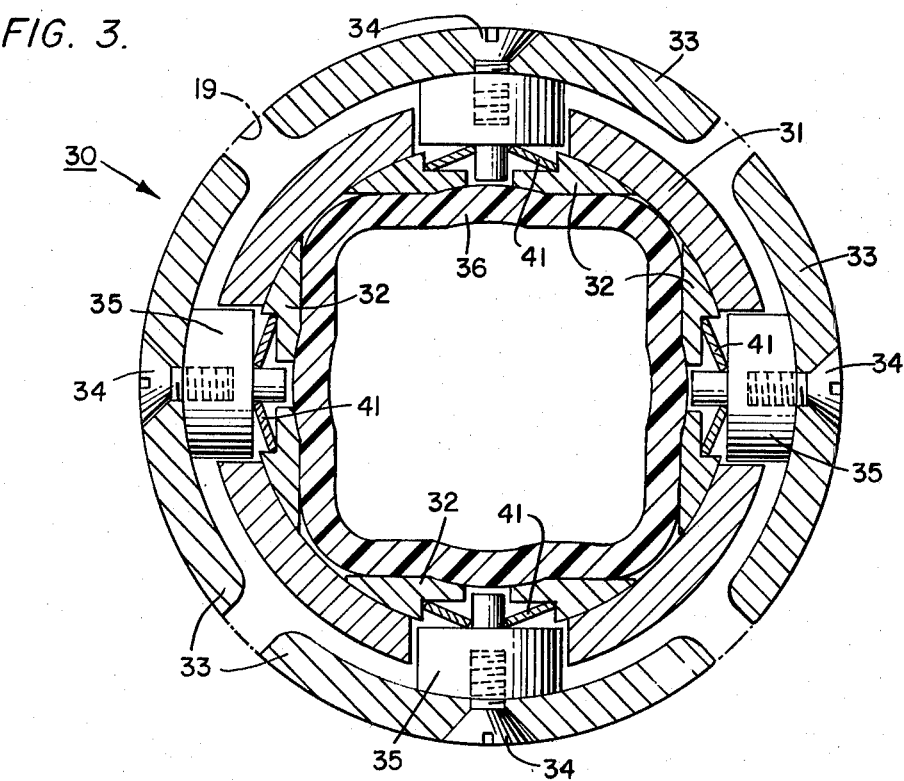
FIG. 3 is a cross-sectional view of an air-expanding mandrel in accordance with the invention.

FIG. 3 is a cross-section of one embodiment of the invention, with features exaggerated to show the construction. In the figure the shaft 30 is shown with the outer leaves 33 expanded against the inner bore 19 of a roll core. It will be noted that, in contrast to the embodiment of FIG. 2, the inner leaves 32 are bottomed out against the inner bore of the main body 31, there being no clearance comparable to the clearance 22 of FIG. 2. Furthermore, the outer leaves 33 are not fixedly spaced from the inner leaves 32, as in FIG. 2, but the outer and inner leaves 33 and 32 are, instead, held apart apart a variable distance by very stiff cup washers 41.

Cup washer 41 compresses to a variable extent, when shaft 30 is used in different cores, to accommodate the slight variation of actual core size among a set of cores of nominally identical size. However, cup washer 41 is not very limber. Instead, it is so stiff that difference in deflection of the topmost cup washer 41, and the bottommost cup washer 41, caused by the weight of the shaft 30 as it lies in the roll after expansion of bladder 36, is negligible.

In a typical core-shaft combination, the total radial clearance (both sides summed) between a nominal 3 inch core and an unexpanded 3 inch shaft would be about 0.04 inches. This is enough to permit easy insertion of the shaft into the core. With the prior art shaft of FIG. 2, the resulting radial eccentricity would be about 0.02 inches. With the improved shaft of FIG. 3, the radial eccentricity is reduced to any desired amount, depending on the choice of the stiffness of the cup washers. That stiffness is limited only by the bursting and crushing strength of the core, and by the variance in actual core sizes within the nominal size. If all the cores are sized exactly alike, the cup washers could be tailored to exert maximum safe pressure when both the inner and outer leaves are fully seated. If some cores are smaller and some larger, the cup washers must not be so stiff as to damage the smallest core when both the inner and outer leaves are fully seated. The range of expansion in larger cores is determined by the requirement that the outer leaf must push against the core with sufficient force to prevent slipping between shaft and core. In actual practice, the parts are sized so that the cup washer, of the Belleville type, is deflected to about 75% of full rated load for properly sized cores.

In the prior art embodiment of FIG. 2, the inner and outer leaves 12, 13 are fastened together, so that the outer leaf 13 cannot fall off the shaft 10. However, as shown in FIG. 3, the outer leaf 33 is not fastened to the inner leaf 32, so that the outer leaf 33 could fall off. The inner and outer leaves 32,33 cannot be fastened to each other, as a fastening would defeat the purpose of cup washers 41. Accordingly, a lost motion connection is established between the inner and outer leaves, in order to hold the outer leaves captive. This lost motion connection will be explained in connection with FIGS. 4, 5 and 6, which disclose a commerical embodiment, with the bladder deflated.

Shaft 60 includes a main body tube 61 mounted on stub shafts 62, which are machined at their outer ends to provide journal surfaces 64 and 65, concentric with the outer surface of main body tube 61. These parts are held assembled by set screws 66.

Figure 5:
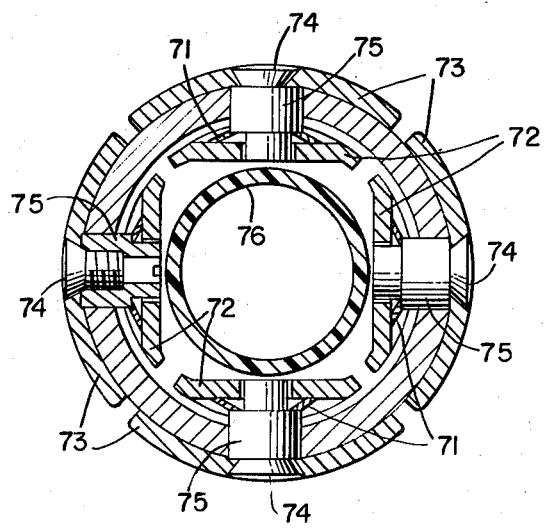
FIGS. 4, 5 and 6 are, respectively, a partly exploded longitudinal view of a commercial embodiment of an air-expanding mandrel and two cross-sectional views thereof.
Figure 6:
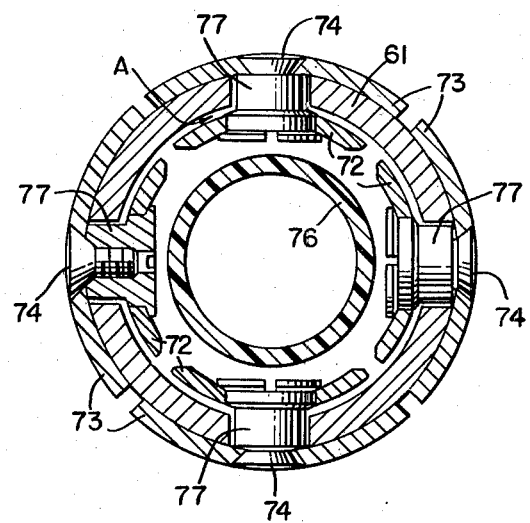

Shaft 60 also includes inner and outer leaves 72 and 73. Each outer leaf is connected to its corresponding inner leaf by a number of push nut connections, as shown in FIG. 5 and by at least two loose-play hold-back connections as shown in FIG. 6. The connections in each case include a flat head socket cap screw 74 screwed into either a push nut 75 (FIG. 5) or a captive nut 77 (FIG. 6).

Separating the inner end of the push nuts 75 and the outer face of the inner leaves 72 are the cup washers 71, so that when the bladder 76 inflates and bottoms the inner leaves 72 against the inside of main body tube 61, the outer leaves 73 are forced outwardly by means of the outward push of cup washers 71.

On the other hand, the captive nuts 77, which have an enlargement at their radially inner ends and have a loose fit connection with the holes of the inner leaves 72 through which they pass, prevent the inner and outer leaves 72,73 from separating by more than a fixed amount. Thus, the captive nut connections prevent the outer leaves 73 from falling off.

A shop-line air hose connection 78 is provided for inflating bladder 76. The connection is a rotary joint type. A side entry joint can be used where the period of use is short and the air in the bladder will retain its pressure. In actual practice, 60 pounds/square inch is used to completely seat the inner leaves and thereby thrust the outer leaves against the inner bore of the cardboard core. Even with slightly undersized cores, this resulting spring pressure is not sufficient to injure a 3" core.

A pilot sleeve 79 is provided at each end of shaft 60 so that the external surface of the shaft 60 is smooth, when the outer leaves are retracted. This makes the loading of shaft 60 into a roll easier.

Figure 4:
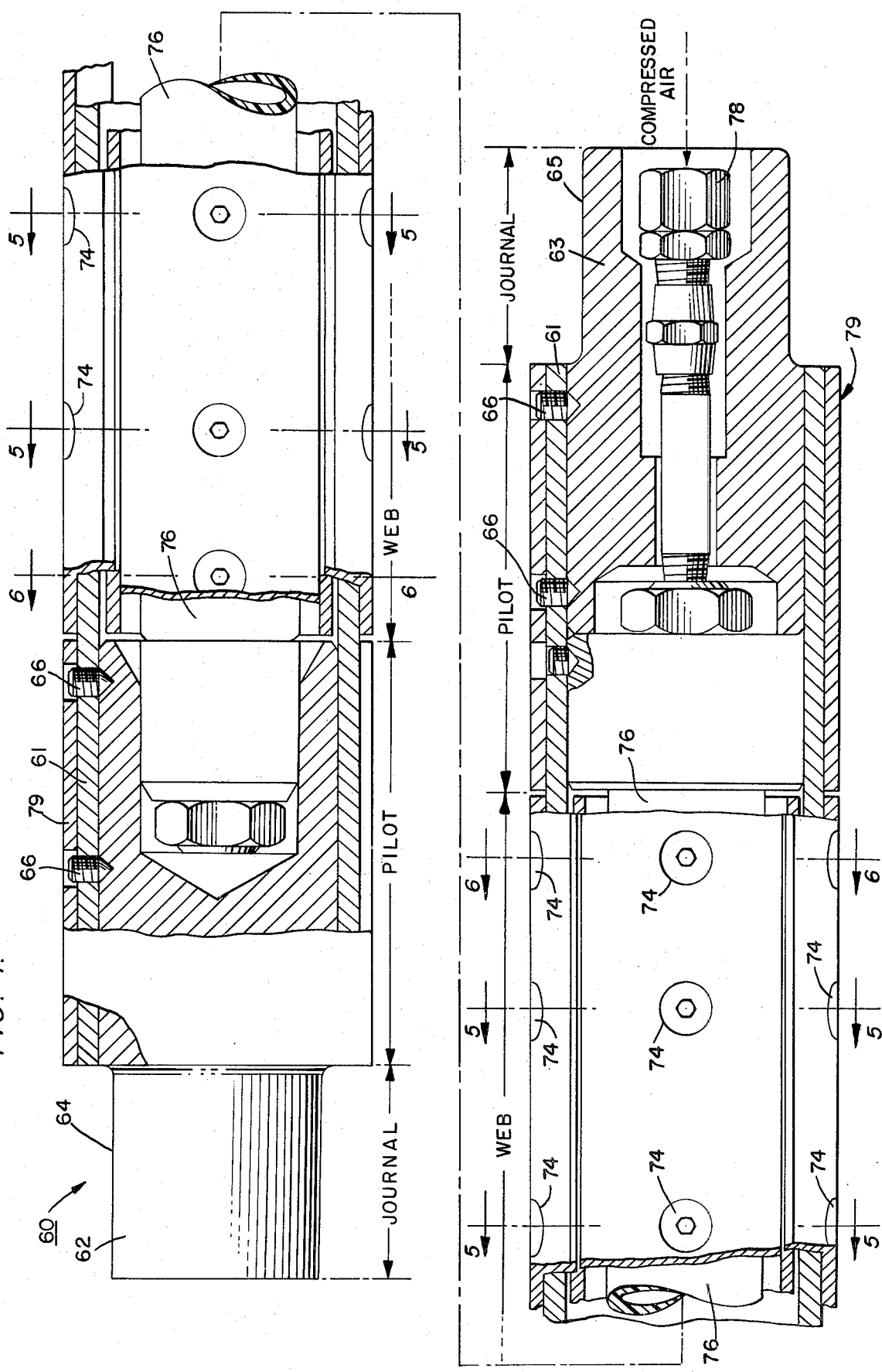

The outer leaves in the embodiments of FIGS. 4 to 6 are held captive but are nonetheless loose. If desired, in order to make insertion of the shaft 60 into a roll easier, retracting springs can be inserted into spaces such as marked A in FIG. 6, to withdraw the outer leaves when the bladder 76 is deflated. Such springs must be provided with clearances, so as not to interfere with the seating of the outer surface of inner leaves 72 on the inner bore of main body tube 61.

Another embodiment of the invention is an expanding chuck for holding workpieces during a machining operation. Chuck 80 of FIG. 7 is a single ended chuck rather than a double ended mandrel. It includes a main body 81 which is mounted on the machine spindle by chuck adapter 82. The expanding chuck includes inner and outer leaves 92 and 93. Flat head screws 94 and push nuts 95 cooperate with cup washeres 91 to transmit the outward push from inner leaf 92 to outward leaf 93. The outer leaves will not fall off because the cup washers 91 are captive to the short stubs 96 which extend inwardly from the push nuts 95. For example only, the cup washers could be staked to the short stubs 96. The rubber boot 86 can be inflated either by air or by hydraulic fluid. It is to be noted that many machines in the machine shop are provided with pressurized fluid spindles, either for actuating chucks, or for operations such as gun drilling. Accordingly, a fluid expanding chuck has widespread utility.

In a typical fluid expanding chuck, adapted for chucking a workpiece, such as a roll, with a 6 inch diameter bore 5 inches long, at 80 pounds per square inch air pressure, the chuck can concentrically support such a roll weighing 3,200 pounds and turn it with a slip-free torque of 3,500 inch pounds.

The inventive concept is also applicable to an internal air-contracted chuck, wherein the parts of FIG. 7 are turned inside out, as shown in FIG. 8. The operation of the chuck of FIG. 8 need not be explained, since its construction and operation will be evident from what has preceded.

As will be understood by those skilled in the art, the outer leaves can be replaced by smaller area lugs, ribs or buttons, which will, because of their smaller area, indent the inside bore of a core, and therefore afford a greater slip-free torque.

I claim:

1. In a device for holding and rotating any one member of a class of objects;
   said class of objects being characterized in that each member thereof has a major surface in the shape of a circular cylinder,
   the diameter of the major surface of each member of said class of objects being nominally identical, but varying slightly from the nominal diameter and from the shape of a circular cylinder by small individual manufacturing tolerances;

the major cylindrical surface of each member of said class of objects defining a longitudinal axis of symmetry;

said device comprising:

means to rotate said device about an axis of rotation;

a support body carried by said means to rotate, extending longitudinally from said means to rotate along the said axis of rotation and disposed symmetrically about said axis of rotation;

a plurality of identical abutting members symmetrically arranged about said axis of rotation;

each of said identical abutting members being supported on said support body by guide means for limited radial movement perpendicularly to said axis of rotation between an extended and a retracted position;

the extend of and limits of motion of said abutting members permitted by said guide means being such that, when the abutting members are in said retracted position any member of said class of objects may be placed in opposition to said plurality of abutting members of said device without the occurrence of any binding, and, when the abutting members are advanced from said retracted position towards said extended position, said abutting members abut against said major surface of said member of said class of objects and are thereby prevented from advancing further towards said extended position;

a plurality of identical push means, in one-to-one correspondence with said plurality of identical abutting members, arranged about said axis of rotation;

each of said identical push means being supported on said support body for limited radial movement perpendicularly to said axis of rotation between an extended and a retracted position;

said extended position of each of said identical push means being determined by seating engagement of said push means with a limiting surface of said support body, said limiting surface being accurately concentric with said axis of rotation;

elastomeric bladder means, capable of inflation and deflation, for radially extending said plurality of identical push means, to the extent determined by the said limiting surface of said support body, and for radially permitting withdrawal, of said plurality of identical push means;

the improvement comprising:

a plurality of identical stiff elastic means for communicating radial movement of each of said identical push means to the corresponding one of said identical abutting means;

whereby, when said one member of said class of objects and said device for holding and rotating are positioned, relatively to each other, so that said plurality of abutting members are in opposition to said major cylindical surface, and when said elastomeric bladder means is inflated, said elastomeric bladder will expand and radially extend each of the identical push means into seating engagement with said limiting surface, thereby correspondingly communicating movement, by way of a corresponding stiff elastic means, to the corresponding abutting member, thereby compressing said stiff elastic means, to radially extend said abutting member into abuttment with said major cylindrical surface;

the spring deflection rate of said plurality of identical stiff elastic means being sufficient that any eccentric gravity forces present during inflation of said elastomeric bladder means do not substantially interfere with alignment of said axis of rotation and said longitudinal axis of symmetry as said inflation is completed.

2. Subject matter under claim 1 in which:

when said member has a major surface with an actual diameter equal to the nominal diameter, the stiff elastic means are very substantially compressed to a deflection which does not exceed that at which they would take a set.

3. Subject matter under claim 2 in which said deflection is approximately three fourths of that at which the stiff elastic means would take a set.

4. Subject matter under claim 2 in which:

the compressive force exerted by said stiff elastic means, when the member is clamped by the abutting members, is substantially greater than the weight of said device.

5. Subject matter under claim 2 in which:

the compressive force exerted by said stiff elastic means, when the member is clamped by the abutting members, is substantially greater than the weight of any one of said members.

6. Subject matter under claim 1 in which the member has a major surface which is an internal bore and in which said radial movement of said abutting members, upon inflation of said bladder, is outward toward said internal bore.

7. Subject matter under claim 1 in which the member has a major surface which is an external cylinder and in which said radial movement of said abutting means, upon inflation of said bladder, is inward toward said external cylinder.

* * * * *